United States Patent
Finley

(10) Patent No.: US 6,681,931 B2
(45) Date of Patent: *Jan. 27, 2004

(54) CABLE TIE DISPENSER

(76) Inventor: Allen D. Finley, 837-25th St. SE., Rochester, MN (US) 55904

( * ) Notice: Subject to any disclaimer, the term of this patent is extended or adjusted under 35 U.S.C. 154(b) by 86 days.

This patent is subject to a terminal disclaimer.

(21) Appl. No.: 10/052,650

(22) Filed: Jan. 18, 2002

(65) Prior Publication Data

US 2002/0066684 A1 Jun. 6, 2002

Related U.S. Application Data

(63) Continuation-in-part of application No. 09/550,368, filed on Apr. 19, 2000, now Pat. No. 6,343,693.

(51) Int. Cl.[7] .............................................. B65D 85/24
(52) U.S. Cl. ........................... 206/338; 206/523; 24/336
(58) Field of Search ................................. 206/523, 335, 206/340, 38, 472, 443, 446; 220/4.22, 4.23, 4.24; 24/336, 339, 287; 211/60.1, 49.1

(56) References Cited

U.S. PATENT DOCUMENTS

| 1,121,232 A | 12/1914 | Davis |
|---|---|---|
| 3,949,449 A | 4/1976 | Caveney et al. |
| 4,446,900 A | 5/1984 | Markovich |
| 4,526,756 A | 7/1985 | Wong |
| 4,637,097 A | 1/1987 | Secord |
| 4,790,225 A | 12/1988 | Moody et al. |
| 4,836,374 A | 6/1989 | Hutchins et al. |
| 4,955,480 A | 9/1990 | Sexton |
| 5,029,699 A | 7/1991 | Insley et al. |
| 5,144,989 A | 9/1992 | Mika et al. |
| 5,601,194 A | 2/1997 | Brinston |
| 5,794,773 A | 8/1998 | Moyer |
| 5,845,809 A | 12/1998 | Garrett et al. |
| 5,967,316 A | 10/1999 | Abbruzzese et al. |
| 6,023,023 A | 2/2000 | Takeuchi |
| D436,421 S | 1/2001 | Cooper |
| 6,343,693 B1 * | 2/2002 | Finley .................. 206/338 |

* cited by examiner

Primary Examiner—Shian Luong
(74) Attorney, Agent, or Firm—Larkin Hoffman Daly & Lindgren Ltd.; Thomas J. Oppold

(57) ABSTRACT

A cable tie dispenser for holding a supply of individual cable ties and which allows removal of individual cable ties therefrom while firmly, yet removably, holding the remaining supply of cable ties. The cable tie dispenser includes members of compressible resilient material disposed within the dispenser case which compresses around at least a portion of the length of the cable ties sandwiched therebetween to maintain a firm and substantially uniform pressure on the cable ties. The compressible resilient material expands to fill the void left by any removed cable ties thereby ensuring that even the last cable tie remaining within the dispenser is firmly restrained and will not fall out of the dispenser until it is purposefully removed.

8 Claims, 2 Drawing Sheets

CABLE TIE DISPENSER

CROSS REFERENCE TO RELATED APPLICATIONS

This is a continuation-in-part of U.S. patent application Ser. No. 09/550,368, filed on Apr. 19, 2000, now U.S. Pat. No. 6,343,693, for which priority is claimed under 35 U.S.C. §120.

BACKGROUND OF THE INVENTION

1. Field of the Invention

The present invention relates to a device for retaining and dispensing cable ties and more particularly to a cable tie dispenser which enables a user to select and remove individual cable ties from a dispenser while the dispenser firmly holds the remaining cable ties in place.

2. Description of Related Art

Cable ties, such as disclosed in U.S. Pat. No. 3,949,449, for example, are used in various trades to bind or bundle electrical wires, cables or various other items together. Typically, the cable ties come in packages containing large quantities of individual cable ties. When working, a user will typically grab a handful supply of cable ties from the package and place the supply in a pocket of a tool belt, shirt pocket or pants pocket so his hands are free while working. Unfortunately, since the cable ties are essentially loose in the pocket, as the worker bends down or leans to perform his tasks, the cable ties will often fall out of the worker's pocket. Additionally, when the worker attempts to remove one of the individual cable ties from his pocket, often multiple cable ties will be unintentionally pulled out at the same time, falling on the floor, resulting in lost cable ties or wasted time on the part of the worker by having to pickup the fallen cable ties.

Accordingly, there is a need for a simple, efficient, and practical device that allows a worker to maintain a readily accessible supply of cable ties on his person, that also allows the worker to freely move around without having to worry about the cable ties falling out as he moves, and that also allows the worker to select and remove individual cable ties while the remaining supply of cable ties remain firmly held in place.

BRIEF SUMMARY OF THE INVENTION

The present invention provides a cable tie dispenser which includes an area of compressible resilient material which is compressed within the dispenser around a length of a supply of cable ties. The compressible resilient material firmly but removably restrains the supply of cable ties within the dispenser such that an individual cable tie may be selected and removed from the dispenser while the remaining cable ties stay firmly held in place. As the individual cable ties are removed from the dispenser, the compressible resilient material expands to fill the void left by the removed cable ties. Thus, the compressible resilient material maintains a firm and substantially uniform pressure on all the remaining cable ties within the dispenser such that even the last cable tie remaining within the dispenser stays firmly restrained and will not fall out of the dispenser until it is purposefully removed.

A preferred embodiment of the above described cable tie dispenser is comprised of a case having a first portion and a second portion adapted to be matingly connected together. The first portion of the case defines a first cavity and the second portion of the case defines a second cavity. Each of the first and second cavities preferably have an open top and an open bottom. A first compressible resilient member is disposed in the first cavity and a second compressible resilient member is disposed in the second cavity such that when the first and second portions of the case are connected, the surfaces of the first and second compressible resilient members and the open ends of the first and second cavities are in opposing relation. A portion of the cable ties are disposed between the opposing surfaces of the first and second resilient members such that at least one end of the cable ties extends beyond the edge of the opposing surfaces of compressible resilient members thereby enabling a user to selectively grasp one end of an individual cable tie and remove it from the dispenser while the remaining supply of cable ties stay firmly held by the opposing compressible resilient members.

The first and second portions of the case may be removably connected such as by mating fasteners that allow the two portions to be opened or detached such that the user may reload the dispenser with another supply of cable ties after the first supply of cable ties have been used. Alternatively, the first and second portions may be connected; such as by an adhesive, by heat, or other like means, which bonds or welds the opposing portions of the case together.

To accomplish the above objectives, features and advantages, this invention may be embodied in the forms illustrated in the accompanying drawings, attention being called to the fact, however, that the drawings are illustrative only and changes may be made in the specific form illustrated and described within the scope of the appended claims.

DETAILED DESCRIPTION OF THE INVENTION

Figure 1:
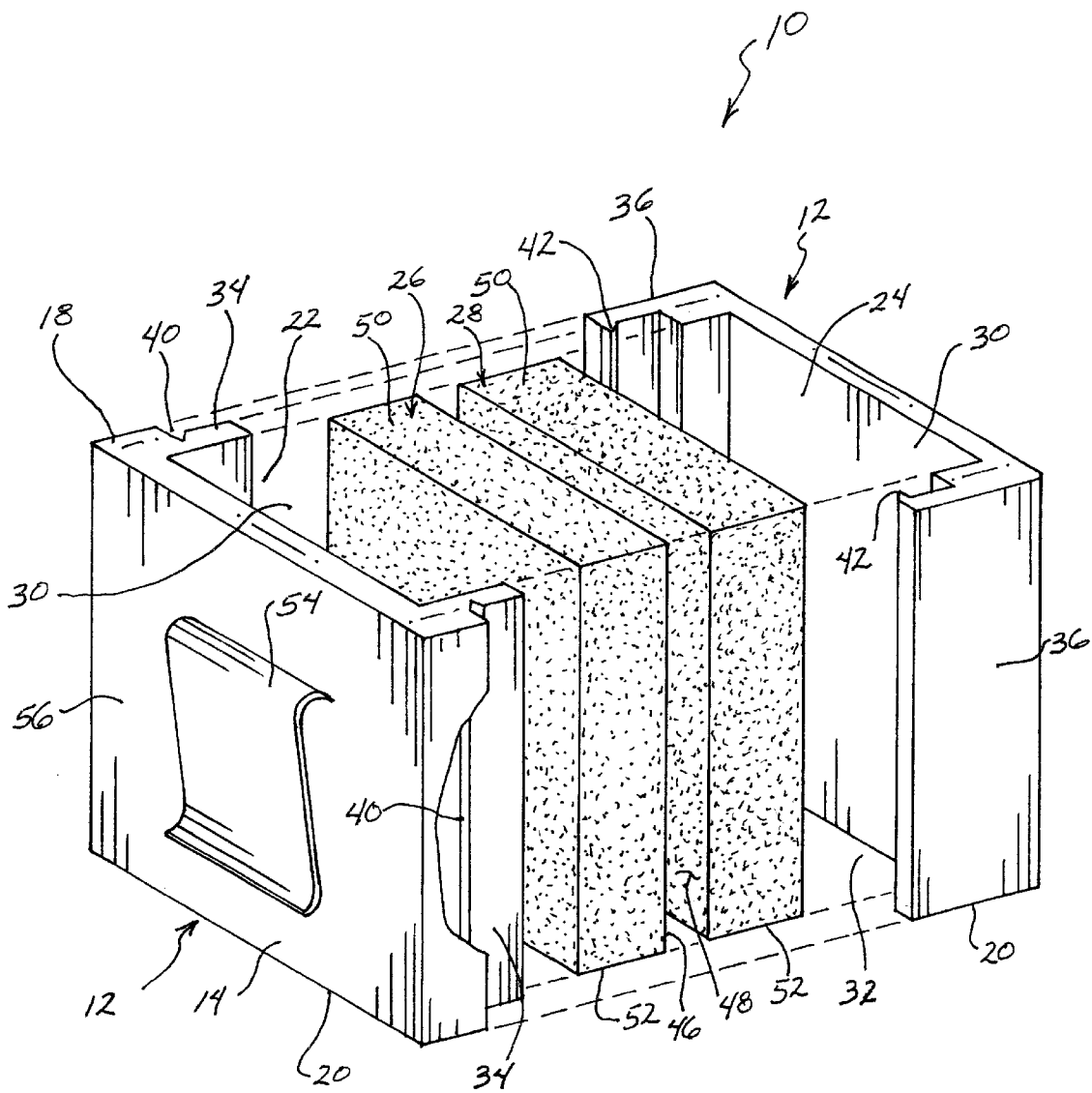
FIG. 1 is an exploded perspective view showing a preferred embodiment of the cable tie dispenser of the present invention.
Figure 2:
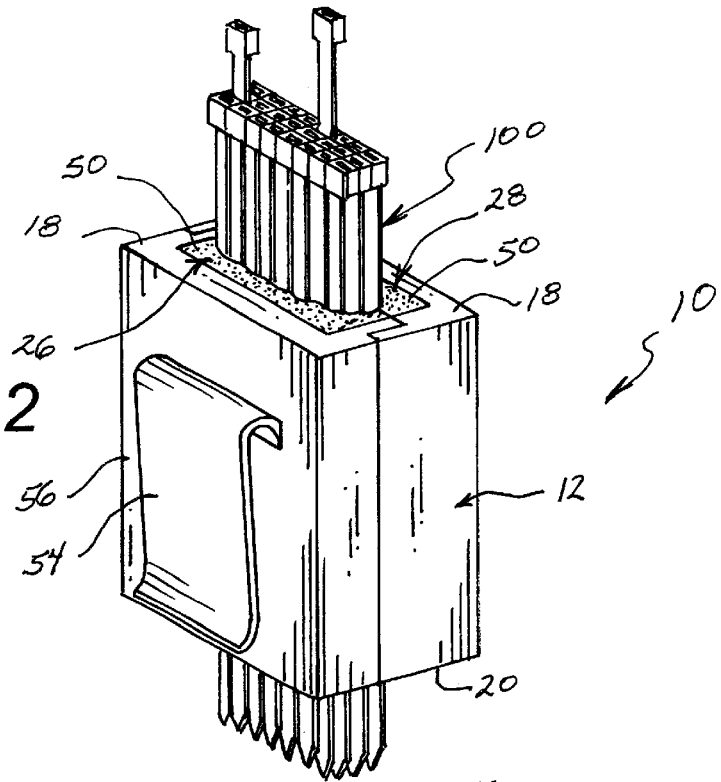
FIG. 2 is a perspective view showing the cable tie dispenser of FIG. 1 loaded with cable ties.

As can be seen by reference to the drawings, and in particularly to FIGS. 1 and 2, the preferred embodiment of the cable tie dispenser of the present invention is designated generally by the reference number 10. The preferred embodiment of the dispenser 10 is comprised of a case 12 having a first portion 14 and a second portion 16 preferably having an overall length less than the length of a typical cable tie 100 as best illustrated in FIG. 2, such that the ends of the cable ties 100 will extend past the top and bottom ends 18, 20 of the case 12 when placed therein as described in detail later. The case 12 may be made of any suitable semi-rigid material including metal, plastic, wood, etc.

The first portion 14 of the case 12 preferably defines a first cavity 22 for receiving a first member 26 of compressible resilient material. Similarly the second portion 16 of the case 12 preferably defines a second cavity 24 for receiving a second member 28 of compressible resilient material. The first and second compressible resilient members 26, 28 are preferably made of synthetic foam or any other material that is both compressible and resilient. Preferably, the first and second cavities 22, 24 include a top opening 30 and a bottom opening 32, the purpose of which will be described in detail later. Additionally, the first and second portions 14, 16 of the case 12 preferably include side walls 34, 36 adapted to matingly receive one another as shown in FIG. 1 or 2.

In the preferred embodiment of the case 12, as best viewed in FIG. 1, the opposing portions 14, 16 include mating fasteners which enable the opposing portions 14, 16 to be removably attached. In the preferred embodiment, a side wall 34 of the first portion 14 of the case 12 includes a groove 40 formed therein to receive a ridge 42 formed in the mating sidewall 36 of the second portion 16 of the case 12 such that the two portions 14, 16 may be removably attached together. Naturally, various alternative embodiments for removably connecting the portions 14, 16 of the case 12 are possible without materially departing from the above teachings. For example, rather than a groove and ridge connection, the sidewalls 34 of the first portion 14 of the case 12 may include a plurality of mating apertures or indentations for receiving mating pegs or catches formed in the mating sidewalls 36 of the second portion 16 of the case 12. Other embodiments such as latches, snaps, buckles, ties, hook-and-loop fasteners, or any other type of mating fastener, may also be used to removably connect to the two portions 14, 16 of the case 12.

Continuing to refer to FIG. 1, the first and second compressible resilient members 26, 28 include a surface 46, 48 which receives a portion of the cable ties 100 (best viewed in FIG. 2). The first and second compressible resilient members 26, 28 also include a top edge and a bottom edge 50, 52 which preferably extend to the top and bottom openings 30, 32 of the cavities 22, 24. The first and second compressible resilient members 26, 28 are preferably of sufficient thickness such that when the first and second portions 14, 16 of the case are connected, the first and second compressible resilient members 26, 28 are required to at least slightly compress such that the opposing surfaces 46, 48 of the first and second compressible resilient members 26, 28 are biased against one another.

When a supply of individual cable ties 100 are placed on the surface 46, 48 of the compressible resilient members 26, 28 and the opposing mating portions 14, 16 of the case 12 are brought together, the compressible resilient members 26, 28 compress around the supply of cable ties 100 disposed therebetween as best viewed in FIG. 2. In use, as a user selectively removes the cable ties 100 from the dispenser 10, the compressible resilient members 26, 28 expand to fill the void left by the removed cable ties, thereby firmly, yet removably, holding the remaining cable ties 100 in place within the dispenser 10. Therefore, it is preferred that the compressible resilient members 26, 28 are of sufficient thickness to ensure that the opposing surfaces 46, 48 are sufficiently biased against one another such that even a single remaining cable tie 100 will remain firmly held in place until it is purposefully removed by the user.

When the last cable tie 100 is removed, the user may open the dispenser 10 by disconnecting the mating portions 14, 16 and reinserting another supply of individual cable ties 100 between the opposing surfaces 46, 48 and reconnecting the opposing first and second portions 14, 16 of the case 12.

Finally, in the preferred embodiment, a clip 54 is affixed to the back face 56 of the cover 12 for supportably securing the dispenser 10 to a belt, pocket, or other portion of an article of clothing of the user.

Figure 3:
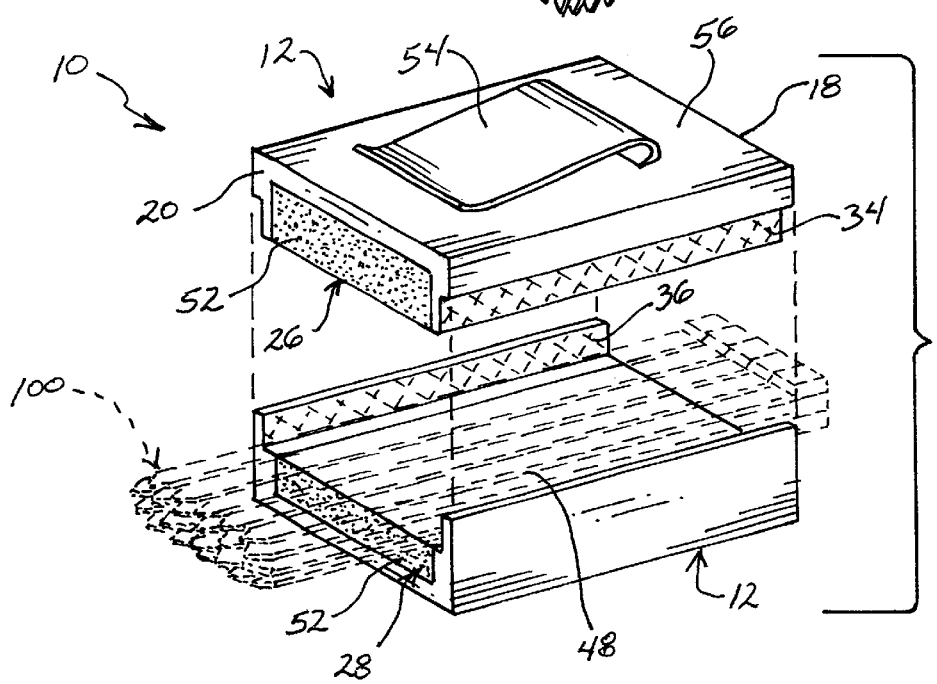
FIG. 3 is a partially exploded perspective view of an alternative embodiment of the dispenser of the present invention in which the dispenser is disposable.

In an alternative embodiment, as shown in FIG. 3, rather than the dispenser 10 being refillable, it may be desirable to simply provide a disposable dispenser that comes pre-filled with a supply of cable ties 100. With a disposable cable tie dispenser, when the user removes the last cable tie 100 from the dispenser 10 the user can simply select another pre-filled cable tie dispenser and continue with his or her work. Such a disposable dispenser may be more practical for users who do not wish to bother with having to open the dispenser 10 to reload it with another supply of cable ties. Furthermore, if the case 12 can be produced by a blow molding process, for example, and prefilled with a supply of cable ties 100 in mass production such that the case 12 is relatively inexpensive as compared to the cable ties, the cost benefit of a disposable cable tie dispenser may be more appealing to some users. Therefore, rather than providing a case 12 that includes interlocking members as discussed above, it may be more economical to simply connect the opposing first and second portions 14, 16 with an adhesive or other bonding agent, or to simply apply heat to bond, weld or fuse the first and second portions 14, 16 of the case 12 together during the manufacturing and/or packaging process; that is not to say that providing a refillable cable tie dispenser 10, such as the preferred embodiment described above, may not also come preloaded with a supply of cable ties and likewise be so economically produced that it too could be considered a disposable dispenser as well as a refillable dispenser.

Although only certain exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A method of holding a supply of individual cable ties and dispensing at least one select individual cable tie from said supply, said method comprising the steps of:

providing a case having a first portion and a second portion, said first portion defining a first cavity and said second portion defining a second cavity, each said first and second cavities having at least one open end;

disposing a first member of compressible resilient material in said first cavity and disposing a second member of compressible resilient material in said second cavity, each said first and second members of compressible resilient material having a surface;

placing said supply of individual cable ties on said surface of said first member of compressible resilient material such that at least a portion of a length of said supply of individual cable ties is disposed on said surface and at least one end of each of said individual cable ties of said supply extends beyond an edge of said surface;

connecting said first portion of said case to said second portion of said case such that said surface of said first member of compressible resilient material is in opposition to said surface of said second member of compressible resilient material and wherein said at least one opening in said first cavity is in opposition to said at least one opening in said second cavity and wherein said at least a length of said individual cable ties of said supply are disposed between said opposing surfaces and said opposing cavity openings, whereby, when said first portion and said second portion of said case are connected together, said first member and said second member of said compressible resilient material compress around said at least a portion of said length of said individual cable ties thereby firmly yet removably restraining said individual cable ties therebetween;

grasping at least one select cable tie of said supply of individual cable ties extending beyond said edge of said first and second members of compressible resilient material, and pulling said at least one select cable tie to remove it from between said first and second members of compressible resilient material.

2. The method of claim 1 wherein said step of connecting said first and second portions of said case includes providing mating fasteners on said first and second portions of said case such that said first and second portions of said case are removably connectable.

3. The method of claim 1 wherein said step of connecting said first and second portions of said case includes applying adhesive to bond said first portion of said case to said second portion of said case.

4. The method of claim 1 wherein said step of connecting said first and second portions of said case includes applying heat to fuse said first portion of said case to said second portion of said case.

5. The combination of a supply of individual cable ties and a cable tie dispenser for releasably holding the supply of individual cable ties such that at least one select individual cable tie may be removed at a time from the cable tie dispenser, wherein the cable tie dispenser comprises:

a case having a first portion and a second portion, said first portion defining a first cavity and said second portion defining a second cavity, each said first and second cavities having at least one open end, and further wherein said first and second portions of said case are adapted to be connected such that said at least one open end of said first cavity is in opposing relation to said at least one open end of said second cavity;

a first member of compressible resilient material disposed in said first cavity and a second member of compressible resilient material disposed in said opposing second cavity, each said first and second members of compressible resilient material having a surface adapted to engage a portion of the individual cable ties with at least one end of the individual cable ties of the supply extending beyond an edge of said opposing surfaces;

whereby, when said first portion and said second portion of said case are connected together, said first member and said second member of said compressible resilient material compress around said at least a portion of said length of the individual cable ties, thereby firmly yet removably holding said supply of individual cable ties within said case such that at least one select cable tie can be removed from said case while the remaining individual cable ties of the supply remaining between said first and second members of compressible resilient materials are firmly yet removably held in place.

6. The combination of the supply of cable ties and the cable tie dispenser of claim 5 wherein said first and second portions of said case further include mating fasteners which enable said first and second portions of said case to be disconnected for reloading another supply of individual cable ties.

7. The combination of the supply of cable ties and the cable tie dispenser of claim 5 wherein said first and second portions of said case are adhered to one another.

8. The combination of the supply of cable ties and the cable tie dispenser of claim 5 wherein said first and second portions of said case are fused to one another.

* * * * *